United States Patent
Hegde et al.

(10) Patent No.: US 11,212,675 B2
(45) Date of Patent: Dec. 28, 2021

(54) SECURE OFFLINE MOBILE INTERACTIONS

(71) Applicant: Visa International Service Association, San Francisco, CA (US)

(72) Inventors: Girish Balakrishna Hegde, Fremont, CA (US); Deepak Dhiman, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 364 days.

(21) Appl. No.: 16/446,917

(22) Filed: Jun. 20, 2019

(65) Prior Publication Data

US 2020/0404495 A1 Dec. 24, 2020

(51) Int. Cl.
*H04W 12/06* (2021.01)
*H04L 29/06* (2006.01)

(52) U.S. Cl.
CPC ......... *H04W 12/06* (2013.01); *H04L 63/0823* (2013.01); *H04L 63/0853* (2013.01); *H04L 63/10* (2013.01)

(58) Field of Classification Search
CPC ............ H04L 63/0853; H04L 63/0807; H04L 63/0823; H04L 63/10; H04W 12/06
USPC .......................................................... 726/4
See application file for complete search history.

(56) References Cited

U.S. PATENT DOCUMENTS

| | | | | |
|---|---|---|---|---|
| 2013/0205133 | A1* | 8/2013 | Hess | ................... H04L 63/0884 713/155 |
| 2015/0254655 | A1* | 9/2015 | Bondesen | ........... H04L 63/0892 705/72 |
| 2018/0262334 | A1* | 9/2018 | Hammad | .................. H04L 9/10 |
| 2018/0300717 | A1 | 10/2018 | Haque et al. | |
| 2019/0319967 | A1* | 10/2019 | Holt | ...................... H04L 63/108 |

OTHER PUBLICATIONS

"Response Wrapping", HashiCorp, Vault, https://www.vaultproject.io/docs/concepts/ressponse-wrapping.html, 7 pages.

* cited by examiner

*Primary Examiner* — Benjamin A Kaplan
(74) *Attorney, Agent, or Firm* — Kilpatrick Townsend & Stockton LLP

(57) ABSTRACT

Systems, methods, and computer readable media for performing mobile interactions using a mobile communication device and an access device without a connection to a data network. An access device can provide the mobile communication device with a value request message requesting access tokens for an interaction. The mobile communication device provides access data including a plurality of access tokens to the access device. The access device can use the access tokens to gain access to value elements stored in data lockers of the mobile communication device. Upon receipt of the value elements, the access device may provide the mobile communication device with access to a resource.

20 Claims, 8 Drawing Sheets

SECURE OFFLINE MOBILE INTERACTIONS

CROSS-REFERENCE TO RELATED APPLICATIONS

None.

BACKGROUND

In order to function, many applications on mobile devices need to have connectivity to a network in order to function properly. For example, mobile payment systems generally rely upon a wallet application executing on a user mobile device for the processing of secure payment transactions with a payment service provider. Typical operations of wallet applications require that the mobile device be connected to a payment service provider via a data network, such as a cellular, wireless or Wi-Fi data network. These typical operations require that the mobile device be online to request, authorize, process, and confirm a payment transaction. The wallet application is unable to function when the mobile device loses the connection to the data network. As a result, the functionality of mobile devices is limited when they are not connected to data networks.

Embodiments of the invention address these and other problems, individually and collectively.

BRIEF SUMMARY

Embodiments of the invention allow for the performance of mobile transactions using a mobile communication device with an access device to secure access to a resource, when the mobile communication device is not connected to a data network. As long as the mobile communication device is in short-range communication or direct communication with the access device, mobile transactions may be conducted according to the various systems and methods disclosed herein.

One embodiment of the invention is directed to a method including receiving, by a mobile communication device, from an access device, a value request message requesting access tokens for an interaction. The method also includes retrieving, by the mobile communication device, a plurality of access tokens, and providing, by the mobile communication device, access data comprising the plurality of access tokens to the access device. The method also includes receiving, by the mobile communication device, an access request message comprising the plurality of access tokens from the access device, and retrieving, by the mobile communication device, a plurality of value elements respectively stored in a plurality of data lockers in a data vault in the mobile communication device respectively using the plurality of access tokens. The method further includes providing, by the mobile communication device, the plurality of value elements to the access device, thereby causing the access device to allow access to a resource.

Additional embodiments include a mobile communication device comprising a processor, and a computer readable medium. The computer readable medium comprises code, executable by the processor, configured or programmed to perform the above-noted method.

Additional embodiments are directed to methods implemented by an access device. In one embodiment, the method includes providing to a mobile communication device, a value request message requesting access tokens for an interaction; receiving, from the mobile communication device, access data comprising the plurality of access tokens generated by the mobile communication device; providing, to the mobile communication device, an access request message comprising the plurality of access tokens; receiving, from the mobile communication device, a plurality of value elements respectively stored in a plurality of data lockers in a data vault in the mobile communication device respectively using the plurality of access tokens; and providing, to the mobile communication device, access to a resource in response to receiving the plurality of value elements.

Additional embodiments include an access device comprising a processor, and a computer readable medium. The computer readable medium comprises code, executable by the processor, configured or programmed to perform the above-noted method.

Further details regarding embodiments of the invention can be found in the Detailed Description and the Figures.

TERMS

Figure 1:
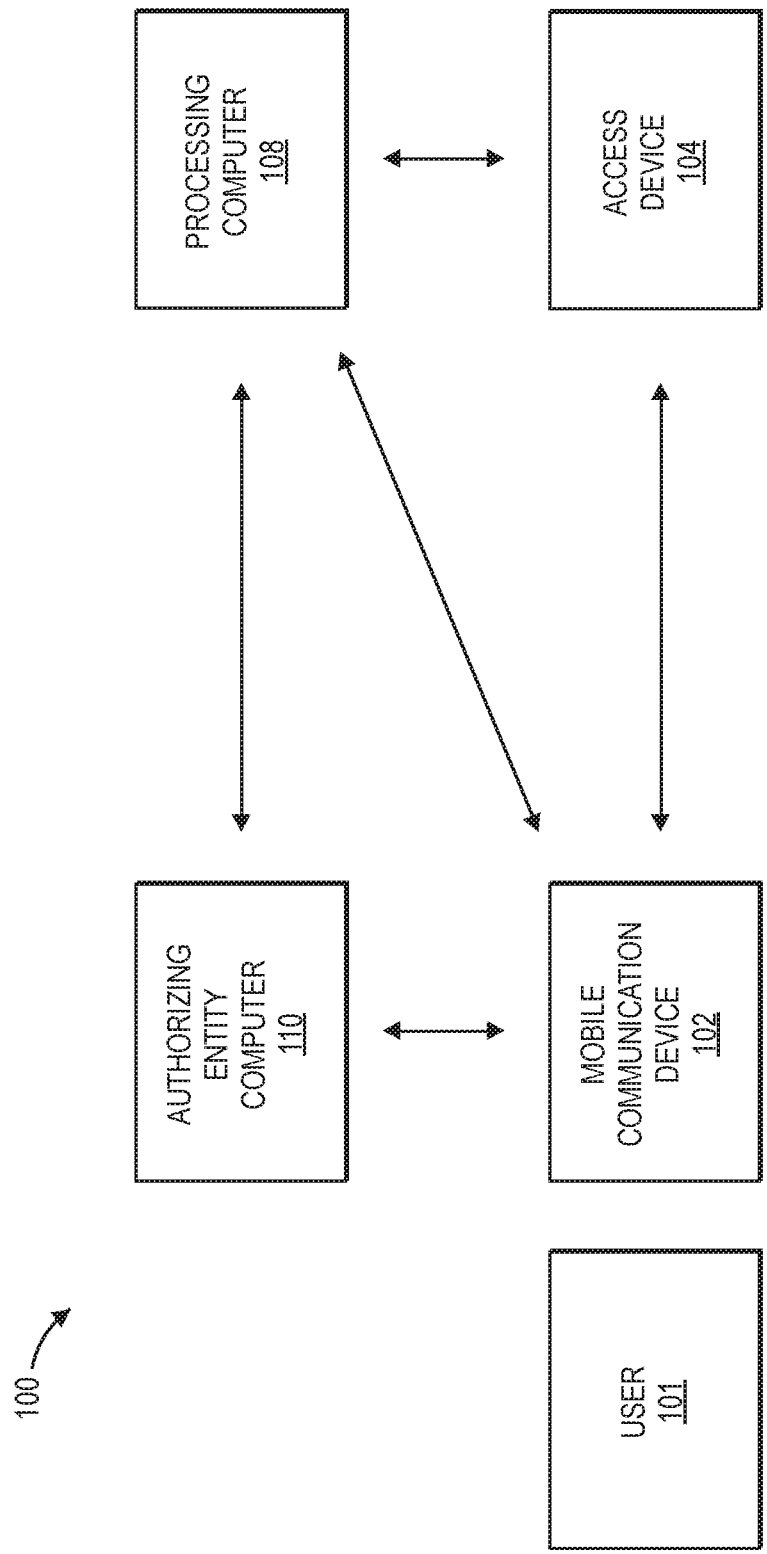
FIG. 1 is a block diagram of an example of a system according to an embodiment.

Prior to discussing embodiments of the invention, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

The term "authentication data" or "authentication information" may include any data or information suitable to authenticate a user or device. Examples of authentication data may include a password or passphrase, a secret key (e.g., a private key), a digital signature, an indication that the device is storing certain information, etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "mobile communication device" may comprise any electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile communication device).

An "access device" may be any suitable device that provides access to a system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile communication device. The POS terminal may or may not initiate processing of transactions.

A "user" may include an individual. In some embodiments, a user may be associated with one or more personal accounts and/or user devices.

An "interaction" may include a direct communication or involvement between two parties. In some embodiments, an interaction may include a payment transaction or exchange for value by a user and resource provider operating an access device.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

"Access data" may include data that can be used to access something. In some embodiments, access data may include one or more access tokens, as well as additional information such as a digital certificate or a path (e.g., a file directory path) to where certain data can be located.

An "access token" may include a token that can be exchanged for access something. The access token may be a string of numbers or letters, which may be used to gain access to a specific type of data or information or thing. In some embodiments, an access token may be data (e.g., including a locker identifier) that can be specifically used to access a data locker in a mobile communication device (e.g., a value element access token). In some embodiments, an access token may be data that can allow a specific entity to access something such as a data vault. Such tokens can be referred to as "client access tokens" in some cases.

An "access request message" may be a message that requests permission to access files, directories, applications, and or information subject to access control techniques.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processing computer" may include a processing network computer associated with processing payments in a payment network. For example, in some embodiments, the processing computer may be configured to provide authorization services, and clearing and settlement services for payment transactions. A processing computer may include data processing subsystems, networks, and operations used to support and deliver authorization services, exception file services, and clearing and settlement services. An exemplary payment processing network may include VisaNet™ Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

A "secrets engine" may include components that store, generate, or encrypt data. In some embodiments, secrets engines may include a set of APIs, functions, and or rules that enable management of data in a secure manner. Each secrets engine may have its own paths and properties within a secure storage memory. To the user, secrets engines may behave similar to a virtual file system, supporting operations like read, write, and delete.

A "data vault" may be a tool for securely accessing data such as secrets and value elements. A data vault can have a unified interface, while providing tight access control and audit logging. An exemplary data vault can manage and enforce access to secrets and systems based upon trusted sources such as trusted applications and trusted users. A data vault may include a number of data lockers.

A "data locker" or "locker" may be a location in a memory that can securely store data. A data locker may include a location of stored data, as well as a path to the data, access policies, and access policy enforcement mechanisms.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

DETAILED DESCRIPTION

Systems and methods according to embodiments enable secure mobile offline interactions between mobile communication devices and access devices. Mobile communications devices may store value elements representing value or assets and may exchange these value elements with an access device for resources controlled by a resource provider.

Certain embodiments present significant advantages in convenience of user experience by enabling interactions via a mobile communication device, without requiring a data network connection in order to securely exchange sensitive and/or valuable data. Methods include receiving, by a mobile communication device, from an access device, a value request message requesting access tokens for an interaction. The value request message may be received via a direct wireless connection between the mobile communication device and the access device, using a short-range wireless protocol. The mobile communication device may retrieve access data comprising a plurality of access tokens from a data vault in a system memory of the mobile communication device. Access data including the plurality of access tokens may be sent to the access device by the mobile communication device, which may receive in return an access request message including the plurality of access tokens from the access device. The mobile communication device may retrieve a plurality of value elements respectively stored in a plurality of data lockers in the data vault respectively using the plurality of access tokens. These value elements are then provided to the access device, thereby causing the access device to allow access to a resource. Thus, a connection a third parties not necessary in order to complete the interaction between the mobile communication device and the access device.

To obtain value elements, the mobile communication device, its user, or a mobile application executing on the mobile application device may request that monetary funds or other digital asset be transferred from an account of the user to the mobile communication device. The requestor may transmit a load request message to a processing computer or directly to an authorizing entity computer, which may determine whether to authorize the transfer. If the transfer is authorized (e.g., the user account has sufficient money or assets to cover the request), the authorizing entity computer may provide an authorization response message to the processing computer, which can generate one or more value elements representing the requested value. The requested value may be deducted from the user account at the time that the value elements are created, or after an access device submits the value elements for settlement.

The value elements may be messages or certificates signed by the processing computer or some other. Value elements may contain the signature of an entity backing the asset or value, an indicator of the value associated with the value element, an asset identifier, and optionally an account identifier. Information useful in redeeming the value element may also be included in the message. For example, if the value element is associated with tickets to a championship sporting event, there may be only a single authorized retailer for the event tickets, such that transfer of the event tickets between parties, using a secure mobile offline interaction would require that the access device redeem the value element with the authorized retailer to obtain the tickets. The use of an asset identifier such as a ticket serial number and a redemption URL for the authorized retailer may be included in the value element.

Value elements received by a mobile communication device may be securely stored as encrypted secrets in "data lockers" of a data vault. The data vault may include one or more secure modules, an API, and a storage backend, for storing secrets. In some embodiments, the user, mobile applications, and authenticated external devices may access, store, and manipulate sensitive information within the data vault, without exposing that sensitive information inside of the data vault outside of the vault.

One or more mobile applications of the mobile communication device may interface with the data vault via an API of the data vault. Mobile applications may accept user input regarding load requests, interaction requests, asset transfers, etc. and may communicate these inputs as requests to the data vault. Each mobile application is authenticated to the data vault using an individual access token to ensure proper logging of transaction history and attribution of secrets.

Once stored in lockers, the value elements can only be accessed by a user or mobile application having the access token for the locker. Each locker has a specific access token or key that is required to access the contents of a locker in the data vault. This prevent unauthorized tampering with the value elements maintained in the data vault.

To provide access to the data vault lockers during a secure mobile offline interaction, the mobile communication device may initiate the creation of a one-time or limited-use access token. The access token may be created for each locker and provided to the access device. Using an access token for each locker containing desired value elements, the access device may connect with the mobile communication device via short range wireless communication protocol, and retrieve the value elements from the data vault lockers.

An access device may store received value elements in a variety of ways including the use of its own data vault, a secure hardware means, other secure software based storage, a removable memory, etc. When the access device connects to a data network, the access device can upload or transfer the value elements to processing computer 108 to begin the settlement process. The processing computer may read the information provided in the value elements and determine the value to be added to an account of the resource provider associated with the access device. If the value or asset has already been deducted from an account of the user, then no further action regarding the user account may be necessary. If the value was not deducted from the account of the user until settlement, the authorizing entity of the authorizing entity may be contacted to adjust the user's account accordingly and clear any holds regarding the value or assets. In some embodiments, funds deducted from a user account may be held by an issuer, processing computer, account manager, or third party in a temporary fund to await settlement.

The various embodiments disclosed herein provide solutions for enabling mobile interactions to continue in the absences of a connection to a data network. By enabling the secure storage of value elements representing value possessed by a user of a mobile communication device, the various embodiments provide users with access to money and assets even when their mobile communication device is not connected to a data network. By leveraging short-range direct communications protocols, the various embodiments enable users to continuously interact and transact with resource providers regardless of whether either party has an active data network connection.

FIG. 1 shows a simplified block diagram 100 illustrating a mobile communication device 102, an access device 104, a processing computer 108, and an authorizing entity computer 110. A user 101 may operate the mobile communication device 102.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Referring to FIG. 1, the mobile communication device 102 may have the capability to generate and store sensitive information securely within a data vault in a system memory in the mobile communication device 102. The stored sensitive information may include value elements associated with physical or digital assets. When the mobile communication device 102 is connected to a data network (e.g., the internet or a wireless local area network), the mobile communication device 102 may communicate with the authorizing entity computer 110 directly or via processing computer 108 to transfer value from an account to the mobile communication device data vault. Value deducted from a user account at the authorizing entity may ultimately be stored as value elements on the mobile communication device 102 within the data vault.

The mobile communication device 102 and the processing computer 108 and/or the authorizing entity computer 110 may exchange load request messages and/or authorization request messages and corresponding authorization response messages over the network as part of a mobile interaction. For example, the mobile communication device 102 may generate a load request message indicating an amount of value to be deducted from an account of the user 101 and may provide this load request message to the processing computer 108, which may submit an authorization request message for the requested value to the authorizing entity computer 110. Alternatively, the mobile communication device 102 may provide the load request/authorization request message directly to the authorizing entity computer 110, which may transmit an authorization response message to the processing computer 108.

The processing computer 108 may be configured to generate value elements based on the value requested in the value load request message. The processing computer 108 may sign messages using one or more cryptographic keys of the authorizing entity computer 110 or the processing computer 108. The signed messages may constitute value elements in some embodiments, and may be provided to the mobile communication device 102 by the processing computer 108 when they are in electronic communication. Value elements may represent the same or different amounts. For example, one signed message may represent one dollar, while another signed message may represent five dollars.

The mobile communication device 102 may receive value elements from the processing computer 108 in response to submitting an authorization request message that is approved by the authorizing entity computer 110. In some embodiments, the user 101 may have an account with the authorizing entity computer 110. A mobile application executing on the mobile communication device 102 such as a wallet application may receive the value elements and submit a request to the data vault for storage of the value elements in lockers of a secrets engine associated with the data vault. Value elements may remain securely stored in the lockers until needed for an interaction with an access device 104.

Once the value elements are stored within the data vault of mobile communication device 102, a data network is not required in order for the mobile communication device 102 to complete an interaction with access device 104. A user 101 desiring a resource controlled by the resource provider operating the access device 104 may use a mobile application executing on the mobile device to initiate an interaction including an exchange of value elements for access to the resource. The initiation of the interaction may be in the form of a secure handshake (e.g., an SSL handshake) using short-range communications protocols such as Bluetooth™ or Near Field Communication (NFC).

Access device 104 can be configured to transmit a value request message to the mobile communication device 102, indicating a request for access tokens in exchange for access to an identified resource. The mobile communication device 102 may provide access tokens enabling access to lockers containing value elements at specific file paths of the data vault. A digital certificate enabling validation and authentication of the value elements may also be provided to the access device 104.

In some embodiments, the access device 104 may be connected to a data network throughout the interaction, and only the mobile communication device 102 may be offline. In other embodiments both the mobile communication device 102 and the access device 104 may be disconnected from a data network.

Settlement of the value elements with respect to the resource provider operating the access device 104 can occur when the access device 104 again connects to a data network. The value elements stored on the access device after transfer from the mobile communication device 102, may be transmitted to the processing computer 108 to initiate settlement. The processing computer may calculate, aggregate, or otherwise determine a corresponding value of all presented value elements and submit a request for an adjustment in an account of the resource provider operating the access device 104 to reflect the calculated value. In an embodiment, the value of the value elements may be deducted from an account of the user 101 at the time of initial authorization and transfer of value elements to the mobile communication device 102. In an example in which the value elements are associated with monetary funds, the processing computer 108 or authorizing entity computer 110 may maintain a temporary hold or ghost entry in a user account ledger illustrating the withdrawal of the funds. Upon submission of the value elements to the processing computer 108 by the access device 104, the hold or ghost entry may be removed from the user account and the funds may be permanently deducted and transferred to an account (e.g, a merchant account) associated with the resource provider operating the access device 104.

Figure 2:
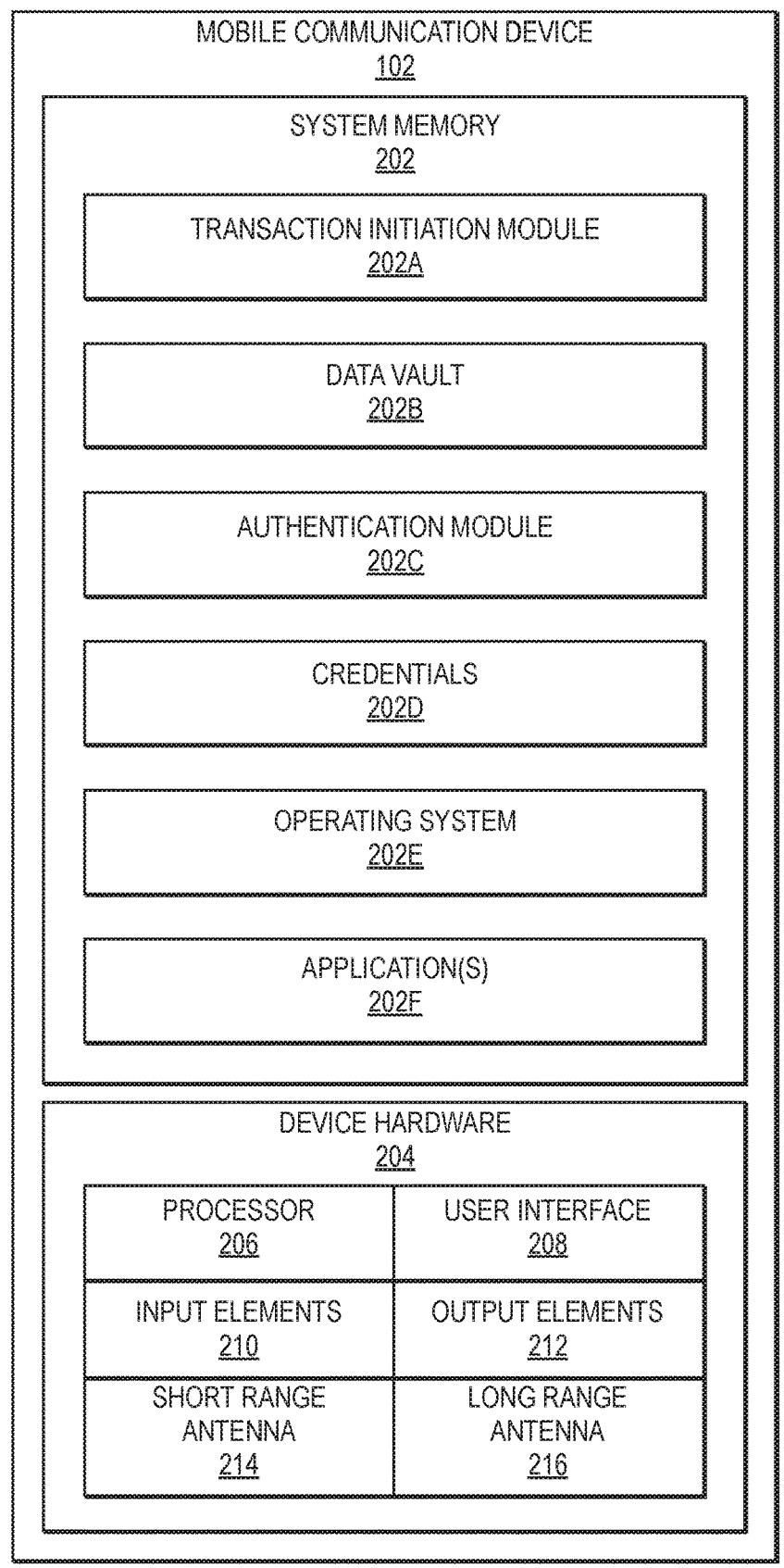
FIG. 2 shows a block diagram of a mobile communication device according to an embodiment.

FIG. 2 illustrates a mobile communication device 102 for use in performing secure offline transactions. Mobile communication device 102 may include device hardware 204 coupled to a system memory 202.

Device hardware 204 may include a processor 206, a short-range antenna 214, a long-range antenna 216, a user interface 208, input elements 210 (e.g., sensors, camera, a keypad, touch screen), and output elements 212. The processor 206 can be implemented as one or more integrated circuits (e.g., one or more single core or multicore microprocessors and/or microcontrollers), and is used to control the operation of mobile communication device 102. The processor 205 can execute a variety of programs in response to program code or computer-readable code stored in the system memory 202.

The long-range antenna 216 may include one or more RF transceivers and/or connectors that can be used by mobile communication device 102 to communicate with other devices and/or to connect with external networks and devices such as authorizing entity computer 110 and processing computer 108. The user interface 208 can include any combination of input and output elements to allow a user to interact with and invoke the functionalities of mobile communication device 102. The short-range antenna 214 may be configured to communicate with external entities such as access device 104 through a short range communication medium (e.g. using Bluetooth, Wi-Fi, infrared, NFC, etc.). The long-range antenna 216 may be configured to communicate with a remote base station and a remote cellular or data network, over the air.

The system memory 202 can be implemented using any combination of any number of non-volatile memories (e.g., flash memory) and volatile memories (e.g. DRAM, SRAM), or any other non-transitory storage medium, or a combination thereof media. System memory 202 may store a mobile operating system 202E and a mobile application environment 202F where one or more mobile applications 202F reside (e.g. a payment application such as a mobile wallet application, merchant application, mobile location application, etc.) to be executed by the processor 205. Also, the system memory 202 may store computer code, executable by the processor 205, for performing any of the functions described herein.

The system memory 202 may also store a transaction initiation module 202A, a data vault 202B, an authentication module 202C, as well as credentials 202D, The transaction initiation module 822 may include instructions or code for receiving an input from a user (e.g., a voice or keyed input command) such as via voice or touch screen. The call may indicate a selection for a transaction to begin and optionally authorization to take place. This may include transmitting one or more limited-use access tokens associated with lockers of the data vault 202B that contain value elements, and a certificate, to an access device 104. Transaction initiation module 202A, in conjunction with the processor 206, may also collaborate with authentication module 202C to authenticate a user of the mobile communication device 102 to the data vault 202B.

Credentials 202D may include one or more access tokens, certificates, keys, etc. for authenticating with the data vault 202B, or for performing other functions. The data vault 202B, discussed in greater detail with reference to FIG. 3, may contain instructions for securely storing sensitive information and value elements. Credentials 202D may also include information identifying the mobile communication device 102 and/or the user of the mobile communication device 102. In addition to the credentials used to authenticate to the data vault 202B, credentials may include a public key associated with the mobile communication device 102 and/or a user of the mobile communication device 102, a digital signature (e.g., the public key of the mobile communication device 102 signed by a key of the authorizing entity computer), payment credentials such as PANs or payment tokens, biometric data (e.g., biometric samples or templates), etc.

Figure 3:
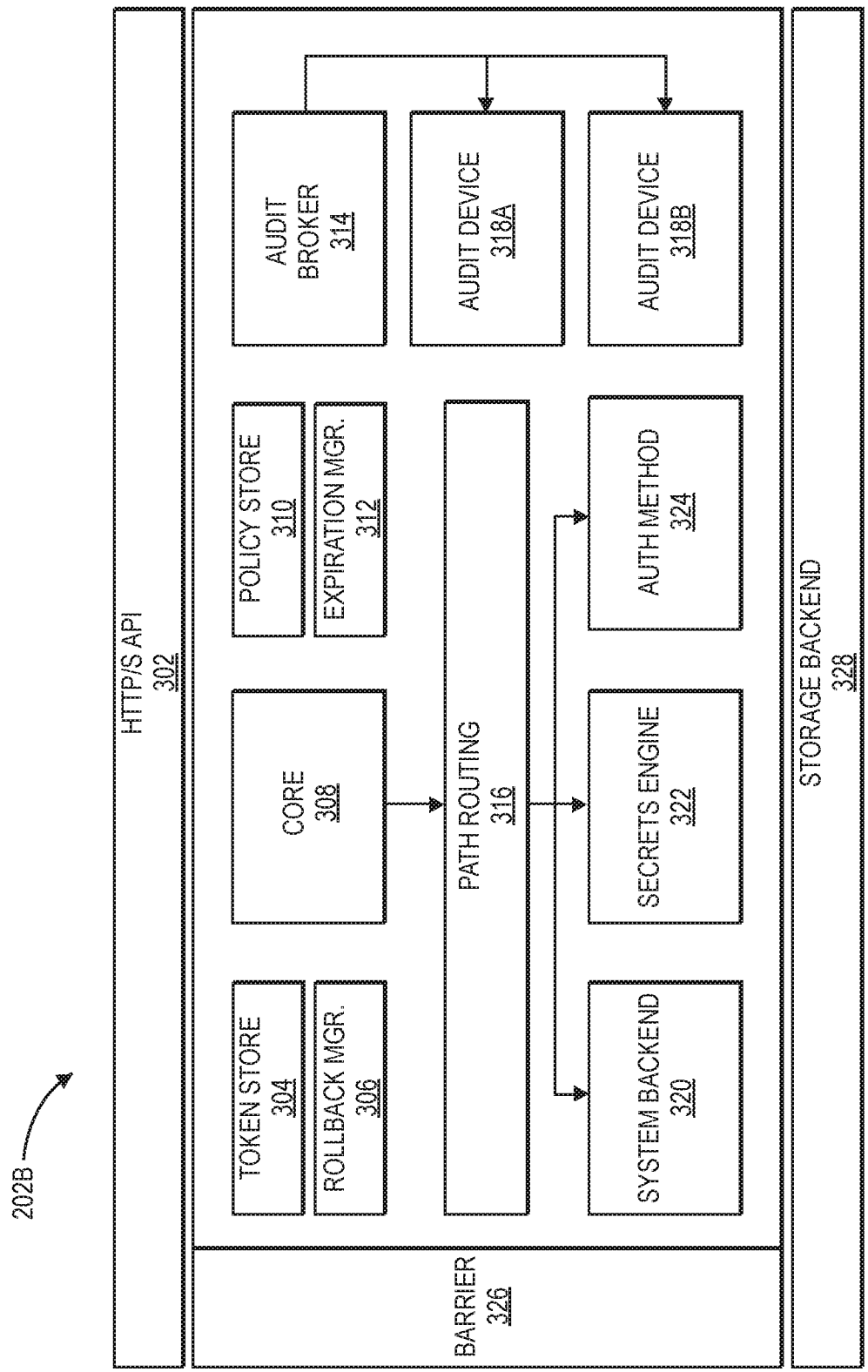
FIG. 3 shows a block diagram of a secure storage of a mobile device in accordance with some embodiments.

FIG. 3 illustrates a data vault 202B according to an embodiment. The data vault 202B may be implemented in the system memory 202 and may include a number of sub-modules for carrying out various operations related to the secure storage of data. The data vault 202B can a centralized data storage within the system memory 202 to securely maintain sensitive information. The data vault 202B can encrypt sensitive data using, for example, 256-bit AES in GCM mode with a randomly generated nonce prior to writing them to storage backend 228. In some aspects, the data vault 202B may be implemented using a product called "Vault" by HashiCorp™.

The data vault 202B may operate as a server. The data vault 202B provides an API, e.g. HTTP/S API 302, which enables users to manage the interaction between a secrets engine, policy enforcement, and secret revocation modules. This architecture also enables centralized audit logging.

Data vault 202B includes a number of modules operating within a secure barrier layer 226, and two unsecured layers that interface with the secure barrier layer 226. Data that flows between the HTTP/S API 302 and the storage backend 328 passes through the secure barrier layer 326. The secure barrier layer 326 ensures that only encrypted data is written out, and that data is verified and decrypted as it enters the data vault 202B. Much like a bank vault, the secure barrier layer 326 needs to be "unsealed" before anything inside can be accessed.

The storage backend 328 may provide persistent, durable storage of encrypted data. The encrypted data may be sensitive information encrypted within the secure barrier layer 326. The storage backend 328 may or may not be a secure storage, but rather stores sensitive information encrypted by the modules within the secure barrier layer 326 of the data vault 202B. The storage backend 328 is configured during set up of the data vault 202B.

The HTTP/S API 302 includes a command line interface (CLI) that enables a user of the mobile communication device 102 to configure the data vault and store sensitive information such as value elements. The storage backend 328 may be a portion of system memory 202 allocated to data vault storage. User input such as secrets storing requests are processed from the HTTP/S API 302 to the core 308.

The core 308 manages the flow of user requests through the data vault 202B. The core 308 also enforces policies, and ensures that audit logging is performed.

Data vault 202B can require that clients authenticate to it upon a first connection, and prior to the fulfillment of any requests by the core 308. Requests for connection to the data vault 202B are processed by the core 308 and routed via path routing module 316 to an auth (or authentication) method module 324. Auth method module 324 determines if the request is valid and returns a list of associated policies. The auth methods module 324 is configurable such that it may return different authentication methods for different types of clients. Users' connection requests, such as those of a user 101 of the mobile communication device 102 may be provided with username/password authentication methods, while applications may be provided with public/private key or tokens authentication methods.

Initial authentication may be required for a user 101 of the mobile communication device 102 hosting the data vault 202B, and/or an access device 104 attempting to connect to the data vault 202B to retrieve value elements. Once authenticated, a user 101 can generate a one-time use access token enabling an access device 104 to authenticate with the data vault 202B on the mobile communication device 102. Each access token can have several properties including but not limited to: a randomly generated ID; an optional display name; audit logging data; an optional user counter; an optional parent ID identifying the client that generated the access token; associated policies; and/or the source path at which the access token was generated. Use counters can be optionally specified at the time of access token generation. An access token with a use count set to one can be used for a single request before being automatically revoked. Limited use access tokens can be a useful way to enable external parties to have limited access to sensitive information stored within the data vault 202B.

Once a client is authenticated, the auth method module 324 provides the core 308 with a list of applicable policies from policy store 310, to be applied. The data vault 202B generates an access token for the authenticated client to use in future authentication. The access token is used to identify the client for future requests to the core 308 and is passed via HTTP headers as part of each request. Access tokens may be stored in the token store 304.

Data vault 202B may generate any number of policies to provide granular control over the generation and use of file paths. Access to a file path can be explicitly granted via a policy, and a request for access or use of the file path can be prohibited in some embodiments. An action may be allowed if a policy permits it. Policies can be stored and managed by the policy store 310. A system backend 320 can manipulate and manage the policy store 310 and expiration manager 312.

When an authenticated user enters a request including an access token via the HTTP/S API 302, the access token is used by the core 308 to verify the user, and load the user's associated policies. If any of the loaded policies permit access and use of file paths indicated or implied by the user request, then the core 308 approves the request and forwards it to the secrets engine module 322 via path routing module 316. If the secrets engine module 322 returns a secret such as a value element, the core 308 may register the value element with the expiration manager 312 and attaches an expiration time or ID to it. Clients may use this expiration timer or ID to renew or revoke the value element. If a client allows the value element to expire, the expiration manager 312 automatically revokes the value element, removing it from storage backend 328.

One or more audit devices 318A-318B, can be responsible for managing audit logs. Every request to and response from the core 308 goes through the configured audit devices 318A-318B via audit broker module 314. The use of multiple audit devices 318A-318B enables the data vault 202B to provide audit logging of different clients in parallel. The data vault 202B may handle certain partial failures by using write ahead logging with a rollback manager 306.

The secrets engine module 322 can enable the secure reading and writing of arbitrary secrets such as value elements. The secure manages value elements stored in the storage backend 328 and processes requests from clients for access to various value elements. The secrets engine module 322 includes one or more secrets engines. These secrets engines may use policies associated with clients and stored in the policy store 310, to dynamically govern the use of a value element in response to a request.

The secrets engine module 322 encrypts data and then passes it to a storage driver to be written the storage backend 328. Data is thus encrypted before being passed to a storage driver. The storage backend 328 is not exposed to the unencrypted value and lacks the means for decrypting the value element. Each secrets engine within the secrets engine module 322 has a unique engine ID, e.g., a secrets engine called "tickets" might enable limited access to digital certificates representing event tickets and may have the engine ID "etix." The engine ID provides a data root for the secrets engine such that secrets written to the storage backend 328 in association the secrets engine "tickets" will be stored in at the file path " . . . /etix/." Each secrets engine may access and manipulate only the secrets lying along its file path. Because data vault 202B does not support relative path access (such as ../), this makes it impossible for an enabled secrets engine to access other data.

The engine ID used as a path prefix enables the path routing module 316 to route requests from the core 308 to a secrets engine within the secrets engine module 322 that has access to the designated path prefix. For example, requests to access event tickets would be routed to the "tickets" secrets engine using its engine ID "etix" rather than a "wallet" secrets engine storing digital coins or payment tokens and having an engine ID of "wal". When the core 308 receives a request to access a secret stored along /etix/, it matches the path prefix (i.e., engine ID) using a longest prefix match and then passes the request to the corresponding secrets engine enabled at that path.

Various embodiments may use a secrets engine having a "locker" associated with a specific access token. Not only are other secrets engines unable to access each other's lockers, but clients having different access tokens cannot access different lockers of the same secrets engine. Each secrets engine may only access its own lockers using a specific access token. This access token is provided in the HTTP header associated with the access request provide to core 308 and routed to the secrets engine module 322. If an access token associated with one or more lockers expires or is revoked, all the value elements in the one or more lockers may be revoked as well. Thus, a one-time or limited-use access token associated with one or more lockers may only access the locker contents for the limited number of uses specified at generation of the access token.

In various embodiments, the secrets engine associated with a locker and the client associated with the access token may not "see in" to a locker without opening it. While the existence of the locker, in a locked state may be known to the client associated with the access token, neither the client nor the secrets engine can access the locker without opening it to retrieve the contents. The locker may have a path name that is obscured or encrypted by secrets engine module 322. For example the locker may be "../etix/x853Fs90t" enabling the secrets engine to determine that something is stored in locker "x853Fs90t" without providing any indication as to the locker contents.

In some embodiments, such as those in which the locker contains value elements associated with monetary value, the secrets engine module 322 may generate a locker ID such that the locker ID provides some indication to the relevant secrets engine of value of the one or more value elements contained in the locker. The locker ID may appear as cipher text or random alphanumeric strings to a human user, but may contain an indicator as the value of the one or more value elements within the locker.

The contents of lockers may be retrieved using the locker ID and the engine ID. This information is routed by the core 308 to the secrets engine module 322, which may search a file path "../engineID/lockerID" and return the contents stored at the file path. In some embodiments, lockers may be one-time use storage options. That is, once a locker is opened and the contents therein are provided to the requesting client, the locker may be destroyed.

As noted above, the lockers of secrets engines within the data vault 202B can store value elements. Value elements may be digital certificates, tokens, or other digital representations of an asset. Files associated with the value elements may be stored in lockers of a secrets engine.

In an example, value elements may be provided to the data vault 202B by an external device such as a processing computer 108 user 101 via the HTTP/S API 302. The external device may provide the HTTP/S API 302 with a name of the file, a secrets engine, an indicator that a locker is desired. The secrets engine module 322 may return the locker ID which may be included in an access token. When the external device or another external device such as an access device desires to access the value element in the locker, the access device provides the access token including the locker ID to the HTTP/S API 302 with a request to access the contents of the locker. The secrets engine module 322 may retrieve the locker contents (e.g., the value element) from the storage backend 328 and may return the value element to the access device. Such techniques may enable mobile communication device 102 to securely store value elements purchased or traded online, e.g., tickets, cryptocurrency, discount codes, account tokens, digital content, etc., until the user 101 wishes to use them to obtain resources.

Value elements may also be stored within lockers of the data vault 202B using a mobile application that is authenticated with the data vault 202B. For example a wallet application may store an access token for the data vault 202B. As discussed herein, the wallet application may enable the user 101 to request that funds be transferred from a user account to the data vault 202B on the mobile communication device 102. The mobile application may transmit a request message to a processing computer, which may communicate with an authorizing entity to fulfill the request. The processing computer may transmit to the mobile application, value elements and a digital certificate of the processing computer or the authorizing entity authenticating the value elements. Value elements may be digitally signed by the authorizing entity and/or the processing computer. The mobile application may then submit a request to the HTTP/S API 302 to store the value elements and the certificate in lockers of the secret engine.

In some embodiments, each locker may be assumed to contain a value element of a certain value. For example, each locker may contain a message or certificate signed by the authorizing entity, and the signed message may be presumed to have the value of $1.00. Each locker containing such a message may be construed has holding $1.00. Thus, the number of lockers in use for the secrets engine may indicate an aggregate stored value (16 lockers=$16.00).

In some embodiments, each value element may have an associated value. The data vault 202B may maintain an encrypted table in storage backend 328 specifying the value of value elements within the lockers of the secrets engine. The list or ledger may be stored in a non-locker path of a secret engine in association with the access token of a user or mobile application such as a wallet application.

Various forms of transactions such as payments, gifts, exchanges, and trades may be performed by providing an access device of another user with a one-time or limited-use access token for a locker. The access device may use the limited-use access token to connect to the mobile communication device 102 via a designated port, authenticate with the data vault 202B and retrieve the contents of a locker associated with the limited-use access token. The limited-use access token may be generated by a user 101 or mobile application and may include information regarding the connection port and the locker ID of a designated locker.

Figure 4:
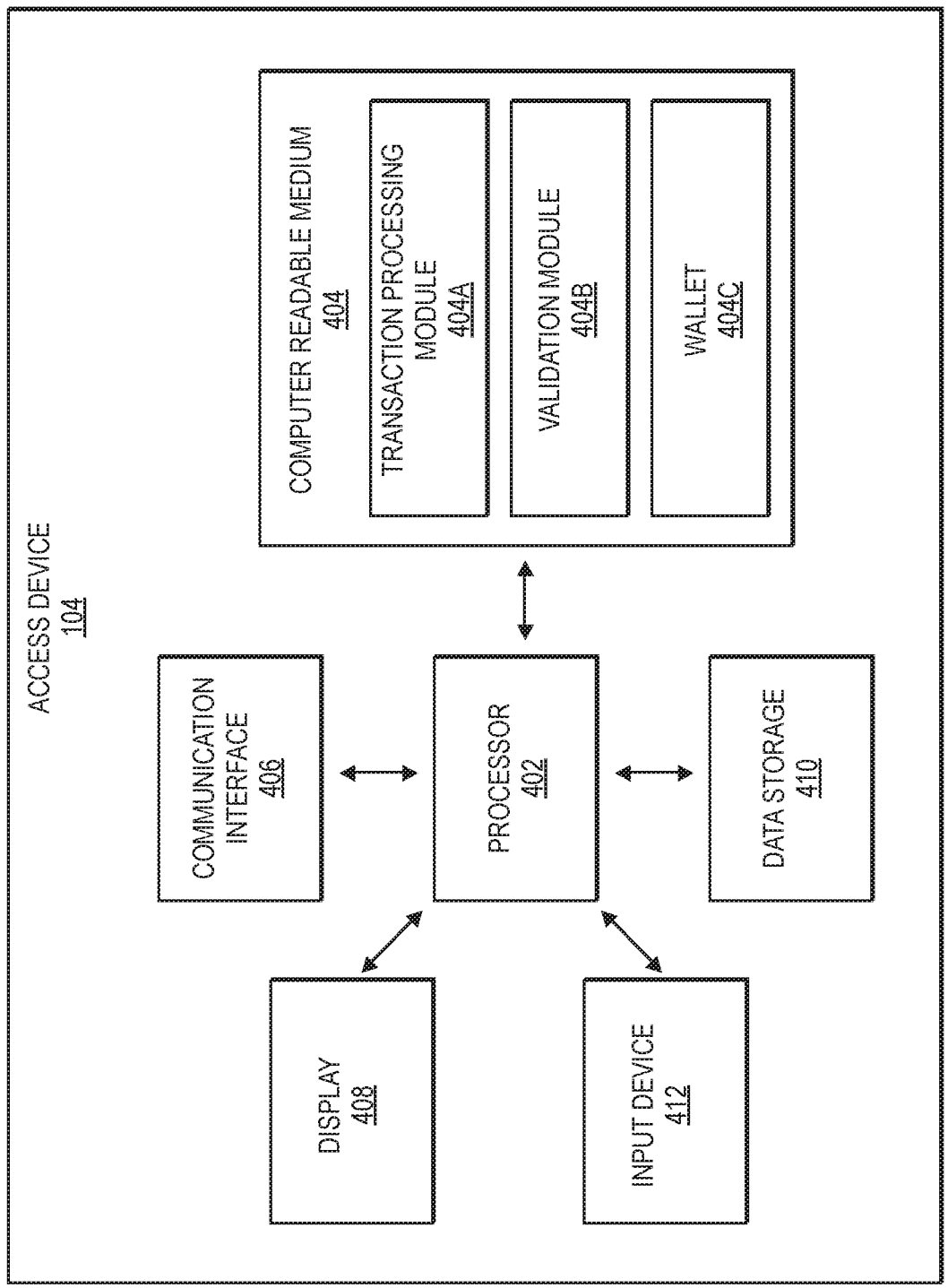
FIG. 4 shows a block diagram of an access device in accordance with some embodiments.

FIG. 4 shows a block diagram illustrating some components in an access device 104. The access device 104 may have one or more processors 402, coupled to a computer readable medium 404, data storage 410, a display 408, an input device 412, and communication interface 406.

The computer readable medium 404 may comprise a transaction processing module 404A, a validation module 404B, and a wallet 404C. The transaction processing module 404A may comprise instructions for instructing the one or more processors 402 to receive a request for a transaction and return a request for value such as a payment request. The validation module 404B may comprise instructions for instructing the one or more processors 405 to validate a certificate of an authorizing entity, an issuer, or a processing computer, such as by comparing the certificate against other certificates or reviewing certificate authority information. The validation module 404B may also validate received value elements by comparing the value elements, signed by an authorizing entity, using the certificate previously validated by the validation module 404B. Validated value elements may be stored in a wallet 404C in the data storage 410.

The computer readable medium 404 may comprise code, executable by the processor 405, for completing transactions with mobile communications device 102 when the access device and/or the mobile communications device 102 lacks access to a data network. Short-range communications may be used to transfer value elements stored in a data vault of the mobile communications device 102 to the wallet 404C or to the access device 104. When data network access becomes available, and communication interface 406 establishes a connection with the data network, the access device 104 may transmit the stored value elements to a processing computer 108 with a request for settlement of the value elements. For example, the access device 104 operated by a resource provider may transmit a request with the value elements to the processing computer 108 to deposit money in the resource provider's account.

Figure 5:
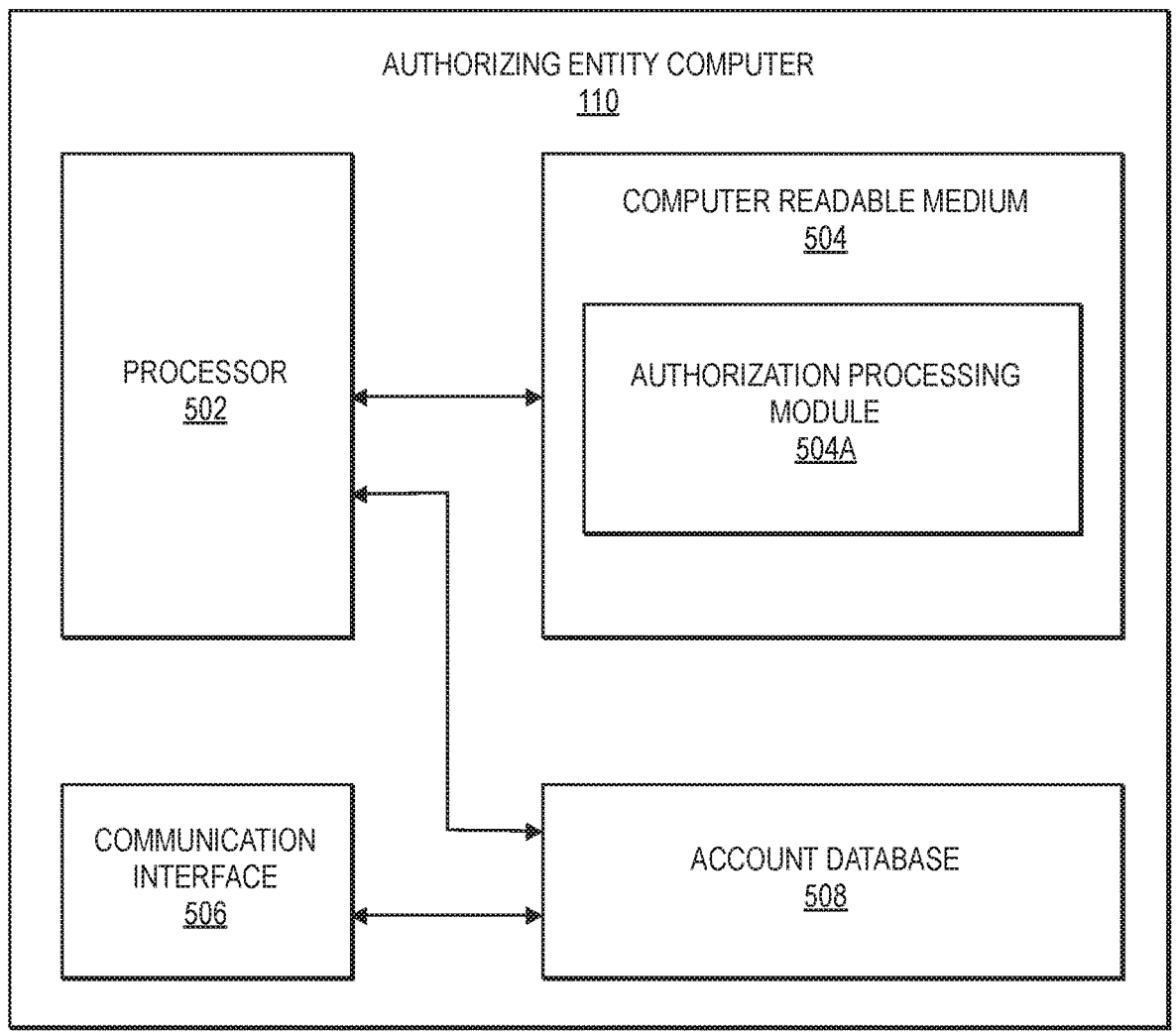
FIG. 5 shows a block diagram of an authorizing entity computer in accordance with some embodiments.

FIG. 5 shows a block diagram illustrating some components in an authorizing entity computer 110. The authorizing entity computer 110 may have one or more processors 502, coupled to a computer readable medium 504, an account database 508, and communication interface 506.

The computer readable medium 504 may comprise an authorization processing module 504A. The authorization processing module 504A may include instructions for instructing the one or more processors 502 to receive an authorization request message for a transaction and return an authorization response message indicating whether or not the transaction is approved or declined. The authorization response message may comprise a digital certificate of the authorizing entity. In some embodiments, the authorization processing module 504A may receive an authorization request message including an account identifier for the purchase of value elements, and may search the account database 508 for the identified account. If the account is found and contains sufficient funds to complete the request, the authorizing entity computer 110 may authorize the transfer of the value elements to a requesting mobile communication device 102.

In some embodiments, the authorization request message can be sent directly from the mobile communication device 102 to the authorizing entity computer 110. In other embodiments, the authorization request message may be sent to a processing computer 108 of a payment processing network such as Visa™. The processing computer 108 may forward the authorization request message to the authorizing entity computer 110 and may take action based on the received authorization response message.

Authorization for the transfer of value may take place when a mobile communication device 102 is connected to a data network, such as via long-range antenna 216. Value elements may be loaded onto and stored on mobile communication device 102 during times of connectivity and then used to complete secure offline transactions when a data network is unavailable.

Figure 6:
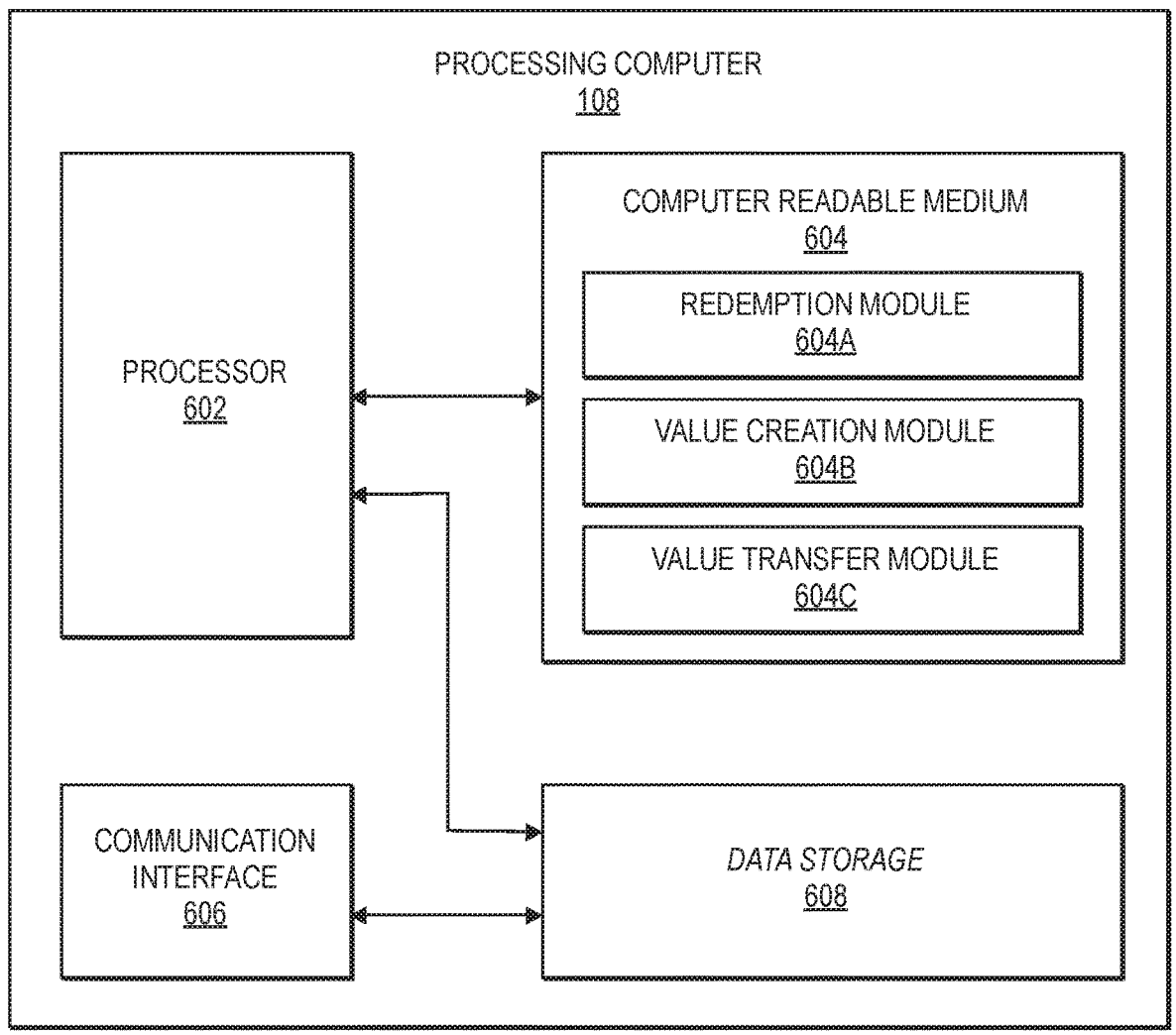
FIG. 6 shows a block diagram of a processing computer in accordance with some embodiments.

FIG. 6 shows a block diagram illustrating some components in a processing computer 108. The processing computer 108 may have one or more processors 602, coupled to a computer readable medium 604, data storage 608, and communication interface 606.

The computer readable medium 604 may comprise a redemption module 604A, a value creation module 604B, and a value transfer module 604C. The redemption module 604A may comprise instructions for instructing the one or more processors 602 to redeem value elements received from an access device 104. The redemption module 604A, in conjunction with the processor 602, may determine an aggregated value of value elements received from the access device 104 and may transmit the aggregated value to an authorizing entity computer 110 for settlement. Value creation module 604B may also support load requests from a mobile communication device 102 by generating and submitting corresponding authorization request messages to an authorizing entity computer 110. The value creation module 604B may act in response to an authorization response message indicating that a value transfer is approved, by generating one or more value elements. The value elements may be a message, certificate, or token, signed using a cryptographic key associated with the processing computer, a resource provider computer, other entity. The value transfer module 604C, in conjunction with the processor 602, may transmit the value elements generated by value creation module 604B to a requesting mobile communication device 102. The value transfer module 604C, in conjunction with the processor 602, may also transfer the value elements received form an access device 104 to an authorizing entity or issuer or other asset manager as part of the settlement process in some embodiments.

The processing computer 108 may be associated with a payment processing network, an asset manager (e.g., a ticket sales entity or digital coin issuer), or the like. The processing computer 108 may, using the value transfer module 605C and the processor 602, provide a digital certificate for the payment processing network, the asset manager, or other entity associated with the value elements to the requesting mobile communications device. The digital certificate may be provided to access devices with which the mobile communication device 102 transacts so that they may validate the value elements.

Figure 7:
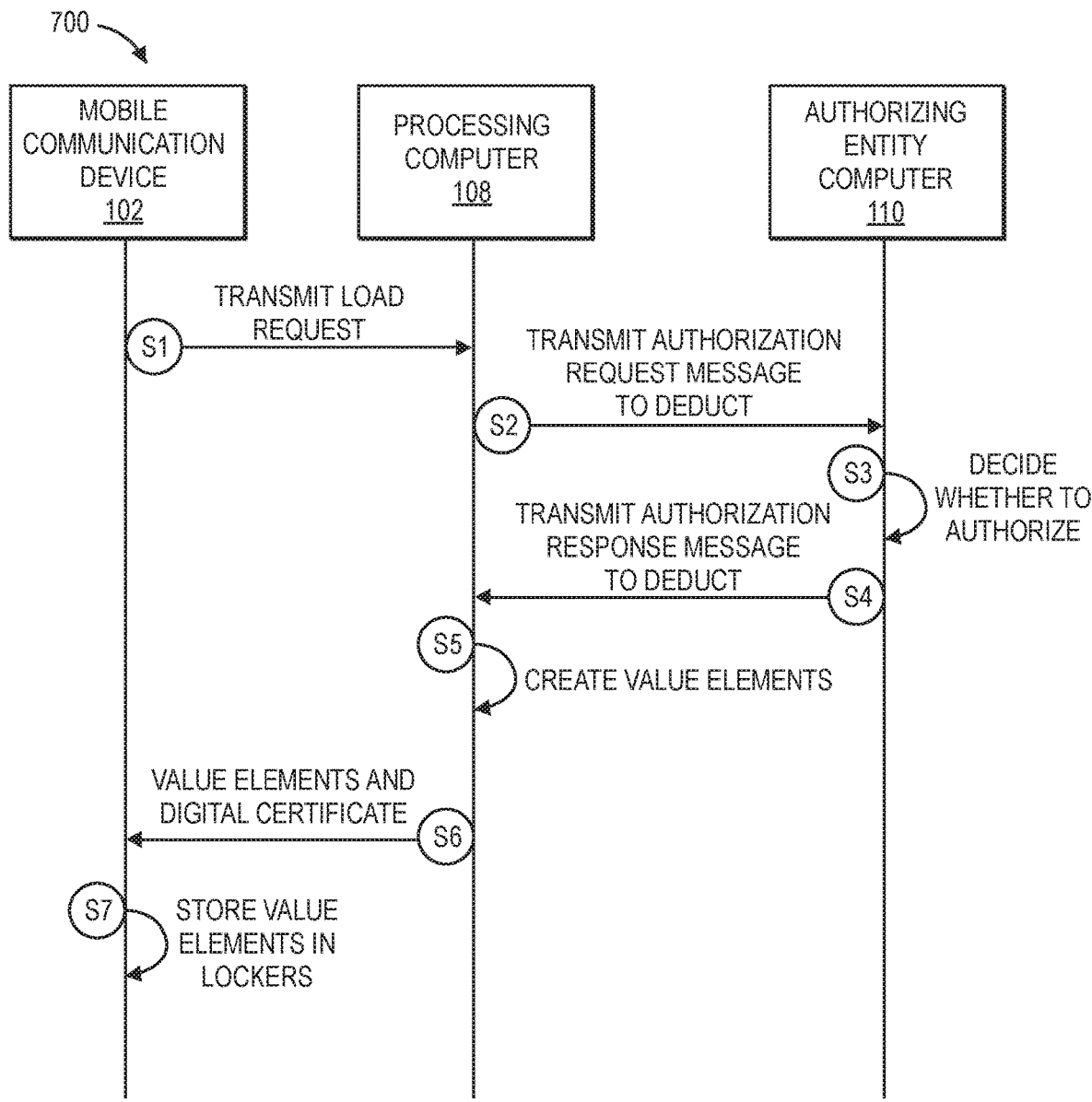
FIG. 7 shows a message flow diagram of a method for adding value to a mobile communication device or use in secure offline mobile transactions, in accordance with some embodiments.

FIG. 7 shows a message flow diagram illustrating a method 700 for loading value elements onto a mobile communication device 102 for use in secure mobile offline interactions. The mobile communication device 102 communicates with processing computer 108 and authorizing entity computer 110 to request and acquire value elements for use in offline interactions with an access device 104.

At S1, the mobile communication device 102 may use one or more antennas (e.g., long-range antenna 216) to transmit a value load request message for a load transaction to a processing computer 108. The load request message may include a user account identifier (e.g., a PAN or primary account number for a credit, debit, or prepaid account number), and an indication of the nature and amount of value elements that the user 101 would like transferred to the data vault 202B in the mobile communication device 102. A mobile application such as a wallet application on the mobile communication device may track the cumulative value and/or the type of value elements stored within the data vault 202B. As such, the load request message may be generated within the mobile application based on user input provided via the user interface 208 of the mobile communication device 102. The generated load request message may be transmitted over a data network to the processing computer 108.

At S2, the processing computer 108 may transmit an authorization request message to an authorizing entity computer 110 for the load transaction. The authorization request message may be based on the load request message received from the mobile communication device 102 and may include at least an account identifier and a value of the one or more value elements requested. Value creation module 604B of the processing computer 108, in conjunction with the processor 602, may generate the authorization request message and transmit the message to the authorizing entity computer 110.

At S3, the authorizing entity computer 110 may use authorization processing module 504A in conjunction with account database 508 to determine whether to authorize the load. The authorizing entity computer 110 may use the account identifier in the authorization request message to search the account database 508 for a corresponding user account. In some embodiments, the account identifier may be obfuscated or tokenized to protect the user's account information. The authorizing entity computer 110 may use the account database 508 to determine whether an account exists and whether the account balance associated with the account is sufficient to meet the transaction amount.

At S4, the authorizing entity computer 110 may generate an authorization response message and may transmit the authorization response message to the processing computer 108. The authorization response message may indicate that the load transaction is approved.

At S5, the processing computer 108 may use value creation module 604B and the processor 602 to generate one or more value elements corresponding to the value indicated in the load request message. The processor 602 of processing computer 108 may use the value creation module 604B to create one or more messages or certificates indicating the value represented or an identifier of an asset. The value creation module 604B may cryptographically sign each value element using a cryptographic key (e.g., a private key) to indicate that the processing computer 108 created it. Any suitable party may verify the authenticity of the value elements using a public key corresponding to the processing computer's private key.

In some embodiments, the digital certificate associated with the processing computer 108 may have been previously stored in a mobile application of the mobile communication device 102, and therefore the processing computer 108 need not send the digital certificate with the value elements. The presence of a digital certificate in system memory 202 of the mobile communication device 102 may be included in the initial load request message transmitted to the processing computer 108.

At S6, the processing computer 108 may transmit to the mobile communication device 102, the created value elements and a digital certificate corresponding to the processing computer 108 (or other entity that created the value elements. The digital certificate may enable validation of the value elements by an access device that receives the value elements during a secure offline interaction.

At S6, the mobile communication device 102 may receive the value elements and the digital certificate. The mobile application may receive the value elements and submit a request to the data vault 202B via HTTP/S API 302 to store the value elements in the lockers in the mobile communication device 102. The mobile application may maintain a list, table, or ledger of value elements stored in the storage backend 328 of the data vault 202B. Because the list may include file paths or access token information for accessing the value elements, it may be stored as a secret in the data vault 202B. However, the list or table may be stored in a secrets engine path that is not associated with a locker in order to improve efficiency in the event that the table or list is repeatedly accessed. In this way, the mobile communication device 102 may securely store the value elements and may use the mobile application to track monetary value and identity of assets maintained in the data vault 202B in preparation for offline interactions.

In order for the mobile application to have read and write access to secret engine of the data vault 202B, the mobile application can be authenticated with a valid access token and one or more policies stored in the policy store 310 indicating that the mobile application holding the access token has permission to read and write to a secret engine.

Figure 8:
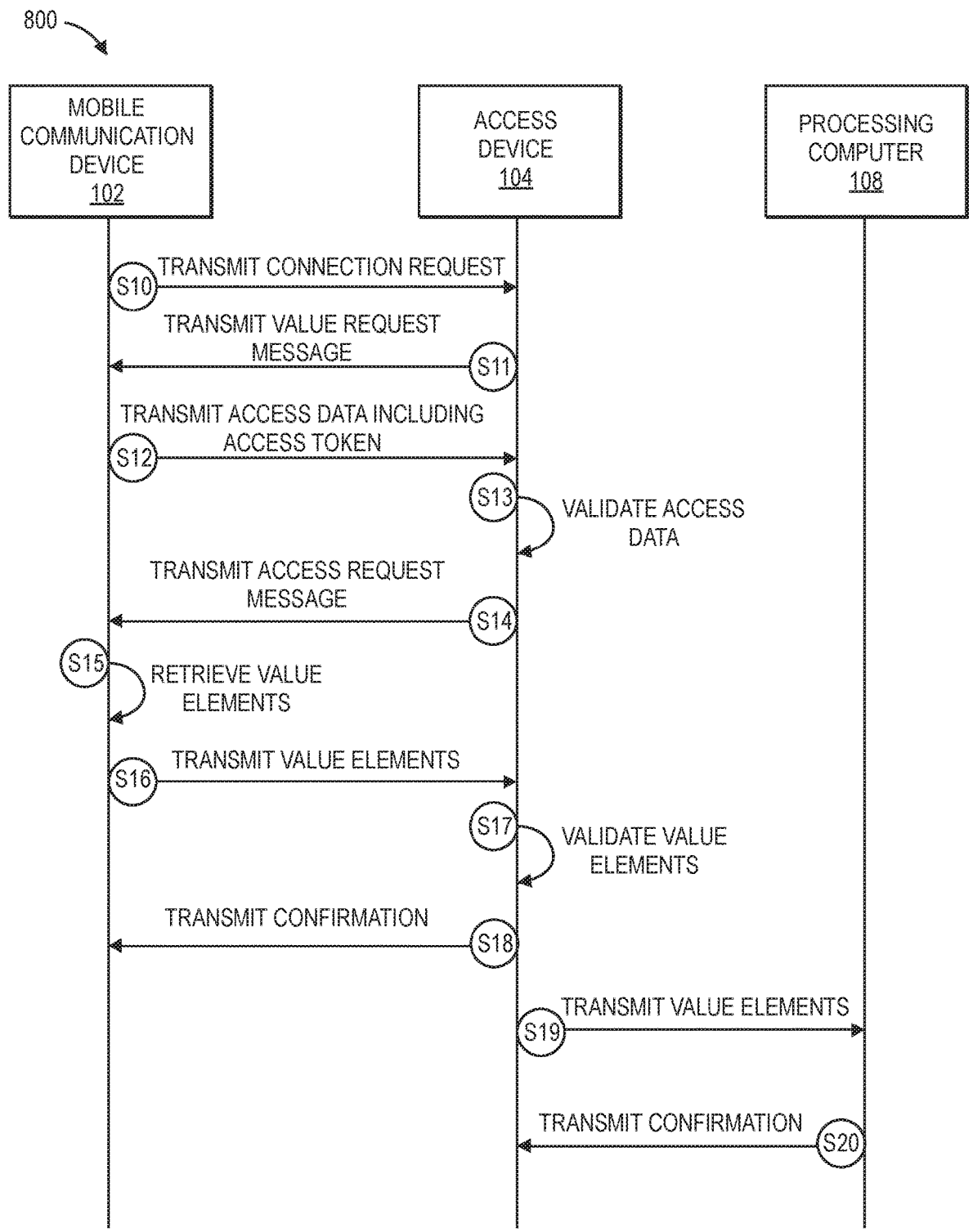
FIG. 8 shows a message flow diagram of a method for performing a secure offline mobile transaction, in accordance with some embodiments.

FIG. 8 shows a message flow diagram illustrating a method 800 for performing a secure offline interaction via a mobile communication device 102. The mobile communication device 102 communicates directly with access device 104 without the aid of a data network connection e.g., (to remote computers). Access device 104 may communicate with processing computer 108 when a data network connection becomes available.

At S10, the mobile communication device 102 may use the transaction initiation module 202A to initiate an interaction with an access device 104. The processor 206 may engage short-range antenna 214 to initiate a handshake with the access device 104 using transaction initiation module 202A. The handshake may be an SSL handshake or other form of secure direct communication handshake.

In some embodiments the user 101 may initiate the interaction by providing input to the mobile application in the form of an instruction to interact or transact with the access device 104. In another example, the user 101 may scan a product code or other resource identifier using an input elements 210 of the mobile communication device. The scanning of such an identifier may cause the mobile communication device 102 to initiate a handshake with the access device 104 whose operator has control over the resource.

At S11, the access device 104 may transmit a value request message to the mobile communication device 102. For example, the processor 206 of the mobile communication device may receive, via the short-range antenna 214, a value request message requesting access tokens for an interaction. A user 101 may have indicated verbally or through other digital communications, an interest in accessing a resource (e.g., a good, service, location or secure data) under the control of the resource provider associated with the access device 104. The resource provider associated with the access device 104 may indicate a price for the resource or an asset to be traded in exchange for access to the resource. The resource provider may provide this value information to the access device 104 as an input, which may then transmit the value request message including the value information to the mobile communication device 102. For example, the resource provider may be a merchant and may be selling a shirt for $20. A value request message including $20 may be transmitted from the access device 104 to the mobile communication device 102.

At S12, the mobile communication device 102 may access the data vault 202B to retrieve access tokens for one or more lockers associated with the secrets engine in the mobile communication device 102, and may transmit or provide access data including the plurality of access tokens to the access device 104. The mobile application may authenticate to the data vault 202B using a client token (e.g., data used to authenticate the application) for the mobile application and may retrieve the list or lookup table of value elements and their file paths. From this list, the mobile application may identify a number of value elements having an associated value sufficient to comply with a value indicating in the value request message. For example, a value element may simply be a message such as "one_dollar" and is signed with a private key of the processor computer. Each of these values elements may have a value of one dollar. There mobile communication device 102 may have 100 lockers, each with one value element. The value element of each locker may be accessed using one access token. The mobile application may identify twenty lockers that hold twenty value elements that cumulatively correspond to a $20 value.

In some embodiments, each value element may represent a different value. The mobile application may thus use the transaction initiation module 202A to calculate a combination of value elements that meets or exceeds the value requested.

For each selected value element, the mobile application may request that the data vault 202B generate a limited-use access token. The limited-use access tokens may be generated using the client token associated with the mobile application. These access tokens and the digital certificate associated with the entity that signed the value elements may be provided to or transmitted to the access device 104. If the value elements were generated or issued by different entities, the mobile communication device 102 may provide multiple digital certificates to the access device 104.

At S13, the access device 104 may use validation module 404B to validate the received access data including the access tokens. For example, a processor 402 of access device 104 may use the validation module 404B to compare the digital certificate against known certificate data for the entity associated with the value elements. The known certificate data may be a certificate stored on the access device 104, certificate authority data, or the like.

At S14, the access device 104 may transmit an access request message to the mobile communications device 102. For example, the mobile communication device 102 may receive, via the short-range antenna 214, an access request message including the plurality of access tokens that were previously validated by the access device 104. The HTTP/S API 302 of the data vault 202B may receive the access request message at a specified communication port, e.g. port 8200. Retrieval of each value element for each locker may require an individual access request message. For example, the access device 104 may submit a separate access request message to the data vault 202B for each access token received. Some embodiments may enable parallel access request message processing or batch access request message processing, enabling the access device to send fewer access request messages by bundling the access request messages for multiple access tokens.

At S15, the mobile communication device 102 may retrieve a plurality of value elements respectively stored in a plurality of data lockers in the data vault 202B in the mobile communication device 102 respectively using the plurality of access tokens. Each access token provided in an access request message indicates the file path of the desired value element. Each access token provided by the access device 104 enables a limited-use access to the locker associated with the access token. That is, the access device 104 is authenticated to the data vault 202B in response to each request message received. This authentication enables the access device 104 to request, via the HTTP/S API 302, that the data vault 202B retrieve the contents of the locker associated with the access token of the access request message. The core 308 passes this request to path routing module 316, which routes the request to the secrets engine module 322, which determines that the request is valid, unlocks the locker, and returns the stored value element. After the value element has been extracted from the locker, the locker can be revoked and the file path can be deleted from the data vault 202B to prevent fraudulent requests for the same value element.

At S16, the mobile communication device 102 may provide or transmit the plurality of value elements to the access device 104, via short-range antenna 214.

At S17, the access device 105 may use validation module 402B to validate the received value elements. The access device 104 may validate the digital signature of each value element to determine if the value elements were issued by the entity associated with the digital certificate. In some embodiments, the validation module 404B may also extract a public key (e.g., corresponding to a private key held by the processing computer) associated with the value elements to validate the value elements if they were signed by a private key associated with the entity associated with the value elements. In response to determining that the value elements are valid, the access device 104 may at S18, transmit a confirmation message to mobile communication device 102.

The resource provider associated with the access device 104 may then provide the mobile communication device 102 with access to the desired resource.

At S19, the access device 104 may transmit the aggregated or accrued value elements to the processing computer 108 for settlement. For example, when the access device 104 connects to a data network, it may transmit accrued value elements from one or more interactions. Account information for the resource provider associated with the access device 104 such as a merchant account, may also be provided to the processing computer 108. The processing computer 108 may use redemption module 604A to identify the value or asset identifier of each value element. In S20, the processing computer 108 may transmit a confirmation of settlement to the access device 104, and/or the actual funds associated with the redeemed value elements.

In some embodiments, the value of the funds or the asset may be deducted from the user 101 account at the time of value element generation. Thus, the settlement process does not impact the account of the user 101. In other embodiments, the funds or asset associated with the value elements are not deducted from the user account until the access device 104 initiates the settlement process with processing computer 108.

Embodiments of the invention have a number of advantages. For example, embodiments of the invention provide for a secure way to allow for a mobile communication device to conduct transactions with an access device to obtain a resource, even when the mobile communication device has no access to a data network. Value elements representing offline value can be securely stored in the mobile communication device can be verified, thus ensuring that any value elements that are used in a transaction are authentic. Further, as noted above, once value elements are used, they may be deleted along with their lockers to ensure that they are not used again. Further, the data vault can control access to the value elements using various policies. This can allow for secure, but flexible access to value elements. Also, the policies could be used to enforce certain types of transactions. For example, if value elements are only to be used at specific types of merchants (e.g., grocery stores), then those value elements may also be released from their lockers if a request for those value elements includes the appropriate merchant identifier.

The above description is illustrative and is not restrictive. Many variations of the invention will become apparent to those skilled in the art upon review of the disclosure.

The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a mobile communication device, from an access device, a value request message requesting access tokens for an interaction;
retrieving, by the mobile communication device, a plurality of access tokens;
providing, by the mobile communication device, access data comprising the plurality of access tokens to the access device;
receiving, by the mobile communication device, an access request message comprising the plurality of access tokens from the access device;
retrieving, by the mobile communication device, a plurality of value elements respectively stored in a plurality of data lockers in a data vault in the mobile communication device respectively using the plurality of access tokens; and
providing, by the mobile communication device, the plurality of value elements to the access device, thereby causing the access device to allow access to a resource.

2. The method of claim 1, wherein the access data further comprises paths respectively associated with the access tokens within the data vault to access the value elements.

3. The method of claim 1, wherein the value elements are messages are signed by a processing computer or an authorizing entity computer, each of the messages being indicative of a value.

4. The method of claim 1, wherein the mobile communication device and the access device communicate during the interaction using a short range wireless communication protocol.

5. The method of claim 1, wherein the data vault comprises a core, a secrets engine, and an audit device.

6. The method of claim 1, there the data vault further comprises a path routing component.

7. The method of claim 1, wherein providing, by the mobile communication device, the access data further comprises a digital certificate of an entity associated with the value elements, thereby causing the access device to validate the digital certificate against known certificate information for the entity associated with the value elements.

8. The method of claim 7, wherein providing, by the mobile communication device, the plurality of value elements to the access device, further causes the access device to validate the value elements using the digital certificate.

9. A mobile communication device comprising:
a processor;
a computer readable medium coupled to the processor and containing instructions for causing the processor to perform operations comprising:
receiving from an access device, a value request message requesting access tokens for an interaction;
retrieving a plurality of access tokens;
providing access data comprising the plurality of access tokens to the access device;
receiving an access request message comprising the plurality of access tokens from the access device;
retrieving a plurality of value elements respectively stored in a plurality of data lockers in a data vault in the mobile communication device respectively using the plurality of access tokens; and
providing the plurality of value elements to the access device, thereby causing the access device to allow access to a resource.

10. The mobile communication device of claim 9, wherein the access data further comprises paths respectively associated with the access tokens within the data vault to access the value elements.

11. The mobile communication device of claim 9, wherein the value elements are messages are signed by a processing computer or an authorizing entity computer, each of the messages being indicative of a value.

12. The mobile communication device of claim 9, wherein the mobile communication device and the access device communicate during the interaction using a short range wireless communication protocol.

13. The mobile communication device of claim 9, wherein the data vault comprises a core, a secrets engine, and an audit device.

14. The mobile communication device of claim 9, there the data vault further comprises a path routing component.

15. The mobile communication device of claim 9, wherein providing the access data further comprises providing a digital certificate of an entity associated with the value elements, thereby causing the access device to validate the digital certificate against known certificate information for the entity associated with the value elements.

16. The mobile communication device of claim 15, wherein providing the plurality of value elements to the access device, further causes the access device to validate the value elements using the digital certificate.

17. An access device comprising:
   a processor;
   a computer readable medium coupled to the processor and containing instructions for causing the processor to perform operations comprising:
   providing to a mobile communication device, a value request message requesting access tokens for an interaction;
   receiving, from the mobile communication device, access data comprising a plurality of access tokens generated by the mobile communication device;
   providing, to the mobile communication device, an access request message comprising the plurality of access tokens;
   receiving, from the mobile communication device, a plurality of value elements respectively stored in a plurality of data lockers in a data vault in the mobile communication device respectively using the plurality of access tokens; and
   providing, to the mobile communication device, access to a resource in response to receiving the plurality of value elements.

18. The access device of claim 17, wherein the access data further comprises paths respectively associated with the plurality of access tokens within the data vault to access the value elements.

19. The access device of claim 17, wherein the value elements are messages are signed by a processing computer or an authorizing entity computer, each of the messages being indicative of a value.

20. The access device of claim 17, wherein receiving, from the mobile communication device, the access data further comprises receiving a digital certificate of an entity associated with the value elements;
   validating the digital certificate against known certificate information for the entity associated with the value elements; and
   validating the value elements using the digital certificate.

* * * * *